United States Patent [19]

Plackard et al.

[11] Patent Number: 4,957,668
[45] Date of Patent: Sep. 18, 1990

[54] ULTRASONIC COMPACTING AND BONDING PARTICLES

[75] Inventors: Dennis L. Plackard; William J. Chafin, both of Alexandria, Ind.

[73] Assignee: General Motors Corporation, Detroit, Mich.

[21] Appl. No.: 280,926

[22] Filed: Dec. 7, 1988

[51] Int. Cl.[5] .................. B29C 35/08; B27N 1/02; H01F 7/00

[52] U.S. Cl. .................... 264/23; 29/607; 29/608; 148/101; 148/105; 264/109; 264/DIG. 58

[58] Field of Search .......... 264/23, 71, 109, DIG. 58; 148/105, 101, 103; 29/607, 608

[56] References Cited

U.S. PATENT DOCUMENTS

| | | | |
|---|---|---|---|
| 2,111,418 | 3/1938 | Buxbaum | 264/71 |
| 2,384,215 | 9/1945 | Toulmin, Jr. | 264/23 X |
| 3,717,427 | 2/1973 | Bodine | 264/23 X |
| 4,014,965 | 3/1977 | Stube et al. | 264/23 |
| 4,315,875 | 2/1982 | Hoedt | 264/23 |
| 4,364,783 | 12/1982 | Theodore et al. | 264/23 X |
| 4,419,196 | 12/1983 | Beckerick et al. | 264/23 X |
| 4,548,771 | 10/1985 | Senapati et al. | 264/23 |
| 4,558,077 | 12/1985 | Gray | 523/458 |
| 4,810,572 | 3/1989 | Ooe et al. | 148/105 X |

FOREIGN PATENT DOCUMENTS 1805090  3/1970  Fed. Rep. of Germany ........ 264/23

*Primary Examiner*—Sam Silverberg
*Assistant Examiner*—Mary Lynn Fertig
*Attorney, Agent, or Firm*—Lawrence B. Plant

[57] ABSTRACT

A method of concurrently compacting and bonding a plurality of solid particles together including combining particles with a thermobonding agent, placing the particle-agent combination in a die having a desired shape, and applying compaction pressure to the particles while concurrently applying sufficient ultrasonic energy to the particles to densify the particles and thermally activate the thermobonding agent.

9 Claims, 1 Drawing Sheet

ULTRASONIC COMPACTING AND BONDING PARTICLES

TECHNICAL FIELD

This invention relates to a method of bonding particles together in a matrix of thermobonding material, and in particular, a method for substantially simultaneously compacting the particles and thermally activating a binder therefor.

BACKGROUND OF THE INVENTION

A variety of applications exist for composite materials comprising particulates held together in a binder matrix. For example, composites made of graphite, glass, boron nitride, silicon carbide, metal, etc., bonded together with a relatively small amount of a thermosetting or thermoplastic polymer have generated considerable interest in recent years for a number of applications. For example, a need exists for low-cost magnetic products such as (1) magnetic cores (e.g., stator cores) for electrical rotating machinery and (2) high strength permanent magnets. Magnetic cores (i.e., flux concentrators) made from polymer-bonded metal (e.g., iron and steel) particles and permanent magnets made from polymer-bonded magnetizable particles have both heretofore been proposed. In this latter regard, permanent magnets have been made from rare-earth-ferromagnetic metal alloy particles held together in a plastic matrix. Early such magnets used samarium-cobalt and other rare earth compounds in a variety of binders. More recently, magnetic compositions containing neodymium and/or praseodymium, iron and boron such as described in U.S. Ser. Nos. 414,936 and 544,728, (both assigned to the assignee of this application), have received considerable attention and these, too, have been bonded together in a polymer matrix. In both cases (i.e., magnetic cores and permanent magnets), high density products having metal loadings greater than about 70% by volume are required to obtain good flux concentration and magnetic strength respectively. Preferably, the metal loading will be greater than about 85% by volume and most preferably about 92% by volume for optimal properties. Generally speaking the higher the metal particle content the better the magnetic or flux-concentrating properties of the part. Hence, the least amount of binder possible is most desirable consistent with the strength requirements, integrity and particle isolation needs of the part.

It is known from a method standpoint to make polymer-bonded magnets, for example, by first directing a stream of molten iron-neodymium-boron alloy onto the perimeter of a rotating chill disk to very rapidly quench the alloy into thin ribbon The thin "melt-spun" ribbon is then ground or comminuted into small particles which are then mixed with a binding agent, placed in the cavity of a conventional punch and die set in a cold press, and compressed/compacted to densify the particle-binder mix and conform it to the shape of the cavity (e.g., disk-shaped). Following compacting, the binding agent is activated either by heating, ultraviolet radiation, or curing in any appropriate fashion which is dictated by the characteristics of the particular binding agent chosen. For example, Gray U.S. Pat. No. 4,558,077, assigned to the assignee of the present invention, employs a thermosetting epoxy comprising polyglycidyl ethers of polyphenol alkanes and a latent imidazole curing agent which is activated by subsequent heating in an oven to cure the binder. Compression molding techniques in heated dies are used with thermoplastic binders. If made from magnetically anisotropically particles, the resulting product is then aligned in a magnetic field prior to subsequent processing. Magnetically isotropic particles, such as Fe-Nd-B, do not require such alignment. Heretofore, such compacting and curing procedures have required the use of heavy compaction presses (i.e., about 5 tons), and relatively long cycle times not to mention additional equipment (e.g., curing ovens), where applicable, and accordingly contribute significantly to the cost of the product being produced.

It would be commercially advantageous to have a simpler, quicker (i.e., on the order of seconds), and less expensive method for making low-binder-content (e.g., less than about 30% by volume) particle-binder composites. It would be especially advantageous to have a quick method for simultaneously compacting and bonding the particles together at significantly lower pressures than heretofore required. It is the principal object of the present invention to provide an improved method for accomplishing the foregoing especially as it relates to the manufacture of magnetic products requiring high metal particle loadings.

SUMMARY OF THE INVENTION

The invention comprehends essentially substantially simultaneously ultrasonically compacting and bonding particles together in a thermobonding agent. The invention is illustrated hereafter in relation to a method for making magnets from rare earth alloy particles but is not limited to such particles. In this context then, the method comprises combining particles of a magnetizable rare earth alloy with a thermobonding agent, placing the alloy-agent combination in the cavity of a matching punch and die set having a desired shape, and applying sufficient compaction pressure and ultrasonic energy to the combination to densify the combination and activate the thermobonding agent to cause it to bond the particles together. By "thermobonding" agent is meant a binder material which, upon heating, melts and/or cures so as to form a substantially continuous, hardenable phase/matrix holding all of the solid particles together in a unified mass. Thermobonding agents useful with the present invention are numerous and are selected primarily on the basis of the end use of the finished part (e.g., magnet) or the processing steps remaining after compaction/bonding. Thus, for example, if high temperature applications or processing are anticipated a polyphenylene sulfide or polyimide might be chosen. For purposes of the present invention, virtually any thermosetting or thermoplastic material may be used whose ability to bond the particles together is activated by heat at superambient temperatures (i.e., above room temperature). Hence, potentially useful thermosetting plastics preferably include such materials as alkyds, diallylphthalates, epoxies, polyesters, etc., which cure by addition reactions and accordingly have no reaction by-products. Those thermosets which cure by condensation reactions (e.g., melamines, ureas, phenolics, etc.) could also be used but result in the formation of by-products which must be dealt with and accordingly offer no particular advantage over the addition reaction thermosets. Depending on the particular end product use, potentially useful thermoplastics with the present invention include acetates, acrylics, cellulosics, chlorinated polyethers, fluorocarbons, polyamides, polycarbonates, polyolefins (i.e., polyethylene and polypropylene), polyimides, polyphenylene oxide, polystyrene, polysulfones, etc. The thermobonding agents may be combined with the solid particles by blending particulates of the agent with the solid particles, or, preferably, by coating the particles with the thermobonding agent. The thermoplastics, of course, melt rather than cure under the heat and are subsequently allowed to resolidify to bind the particles together. The binder content will preferably not exceed about 30% by volume. When the binder content exceeds about 30%, it is difficult to melt all of the binder at substantially the same time which is important to maintaining a substantially homogeneous product. In this regard, if some binder melts much before the rest of the binder, the melted binder can be redistributed within the material before the remainder melts owing to the pressure applied thereto by the punch.

Ultrasonic energy is preferably transmitted to the mixtures during compaction by means of the punch used to compact the particles in the die cavity. Hence, the punch itself will preferably comprise an ultrasonic transducer. The ultrasonic energy generates sufficient heat during compaction to activate (i.e., melt/cure) the thermobonding agent and permits compacting of the particles to near maximum density at significantly less pressure than heretofore required to achieve similar densities by compacting in a cold press. The precise amount of energy that must be imparted to the mass in the die cavity will, of course, vary with the total mass of material in the die as well as the amount and nature of the thermobonding agent being used. The amount of energy inputted will vary as a function of the frequency used. In this regard, higher frequencies result in lesser amplitudes and correspondingly less energy and vice versa. Generally, thermobonding agents in smaller parts can be activated at higher frequencies than those used for larger parts. Frequencies varying from about 10 kHz to about 60 kHz and amplitudes varying from about 0.0005 inches to about 0.005 inches are considered useful with the present invention though likely other frequency-amplitude combinations are also useful.

In addition to the benefits of one-step compaction-binding operations, a particularly significant benefit results from the fact that considerably less compaction pressure is required, as compared to conventional cold pressing, to compact particles to the same density when ultrasonic energy is imparted to the particles during compaction. In this regard, conventional cold pressing processes typically require from about 6,000–12,000 psi compacting pressure, while the method of the present invention achieves the same result with only approximately 200–400 psi.

In contrast to conventional multi-step compaction and activation processes, the use of ultrasonic energy during compaction not only reduces the amount of plant equipment needed but also reduces the amount of time otherwise needed for the compacting and bonding operations. In this regard, prior methods have required many minutes to complete whereas the combined compacting/bonding operations of the present invention can be completed in less than about 5 seconds, depending on the nature of the particles, the binder being used, the amplitude and frequency of the ultrasonic transducer and the pressure applied. Although many parameters are involved, the typical cycle time of the present process will be at least one order of magnitude less than the processes used heretofore.

DETAILED DESCRIPTION OF THE DRAWINGS AND EXAMPLES

By way of illustration and in accordance with a preferred application of the process of the present invention, magnets are manufactured from neodymium-iron-boron alloy powders. The neodymium may contain a small amount of praseodymium as is well known in the art and the alloy may contain small amounts of other ingredients such as aluminum, silicon, dysprosium, etc., for metallurgical reasons as is also well known in the art. Suitable amounts of the rare earth, iron and boron are melted together and a narrow stream of the melt directed onto the perimeter of a spinning metal wheel to rapidly quench the alloy and expel a friable ribbon therefrom. The ribbon is then crushed or ground into particles (i.e., about 50 micron size) which are then blended, coated or otherwise combined with a thermobonding agent in amounts up to about 30% by volume of the binder-agent. Preferably, the lowest binder content possible will be used that maintains the strength and integrity of the finished product without compromising its magnetic properties which depend directly on the metal content thereof. Hence, binder contents of about 5% to 15% by volume are most preferred where possible. Of the available thermoplastics, the polyamides are preferred for providing corrosion resistant magnets. Of the thermosets, the epoxy described in the aforesaid U.S. Pat. No. 4,558,077 is preferred.

After combining the Fe-Nd-B alloy particles with the thermobonding agent, the alloy-binder combination is placed in the shaping cavity of a compaction die which cavity has a shape consistent with the destined end use of the magnet formed therein. A matching compaction punch conforming substantially to the shape of the die cavity and made from an ultrasonic transducer is mated with the die cavity and compresses the alloy-binder combination into a magnet shaped like the die cavity and having a density closely approaching the theoretical density of the magnet. The theoretical density will, of course, depend on the precise composition of the compact.

The ultrasonic transducer assembly may conveniently be of the type used in ultrasonic plastic welding equipment and commercially available from such companies as Sonic and Materials Corporation or the Branson Company, both of Danbury, Connecticut. Experience has shown that applying only 20 psi to the 2½ inch air cylinder on a Sonics and Materials welder yields approximately 320 psi on a mass of particles in a ½ inch diameter die cavity and that this, when coupled with the ultrasonics of the present invention, is sufficient to achieve near theoretical density compacts. By way of contrast, a conventional cold pressing using the same punch and die requires approximately 10,000 psi to achieve the same density compact.

Figure 2:
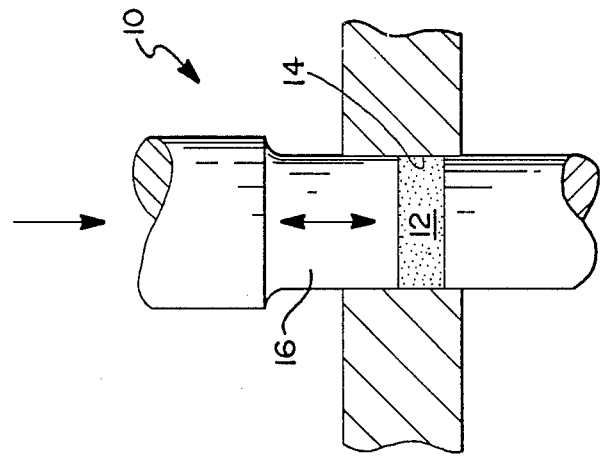
FIG. 2 is the ultrasonic transducer punch and die illustrated of FIG. 1 during compacting.
Figure 1:
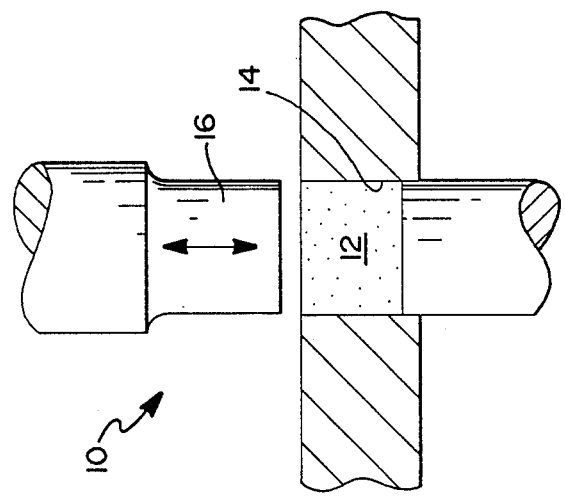
FIG. 1 is a partial, sectional elevational view of an ultrasonic transducer punch and die set useful in the practice of the present invention and shown before compacting.

FIG. 1 illustrates punch and die set 10 of the type used to carry out the invention. The combined Fe-Nd-B particles and thermobonding agent is designated as 12 and shown in a relatively loose configuration within die cavity 14. Die cavity 14 contains and shapes the particle-binder combination 12. An ultrasonic punch 16, conforming substantially to the shape of the die cavity 14, is shown poised above the cavity 14 for subsequent downward travel into the die cavity 14 to compact the material 12 therein as shown in FIG. 2. In FIG. 2, the ultrasonic punch 16 is shown nested with the die cavity 14 in the compacting position so as to apply pressure on the Nd-Fe-B particle and binder mix 12 within cavity 14. Ultrasonic energy is transmitted throughout the magnetic combination 12 within die 14 during compaction and generates sufficient heat to activate the thermobonding agent. If a thermosetting epoxy is utilized, the heat melts and cures the epoxy whereas if a thermoplastic binder is used, the heat merely melts the plastic which is subsequently allowed to resolidify and bind the particles together. The ultrasonic energy may be applied from the outset of compaction or after some initial cold compaction has occurred with no apparent difference in result being apparent.

The following examples describe actual tests performed using thermally activated epoxy and nylon thermobonding agents in conjunction with neodymium-iron-boron alloy particles. The examples are meant to be illustrative only, and the materials, pressures and machines called for therein are not intended to limit the scope of the invention.

EXAMPLES

Example 1

A neodymium-iron-boron alloy comprising principally $Nd_2Fe_{14}B$ was combined with 15% by volume imidazole-cured epoxy binder of the type described in U.S. Pat. No. 4,558,077 supra, and compacted into a 0.522" diameter disk having a resulting thickness of 0.384". Compaction to a density of about 6 g/cc was achieved in 3.58 seconds using a 1500 watt Sonics and Materials ultrasonic plastic welder-driven punch which applied 320 psi on the disk. 2,000 watt-seconds of ultrasonic power was applied in waves having an amplitude of 0.002 inches, and a frequency of 20 kilohertz. The resulting magnets had an energy product of 5.4 megagaussoersteds, and a $B_r$ of 4.8 kilogauss.

Example 2

A neodymiun-iron-boron magnetic alloy was combined with about 30% by volume polyamide resin (i.e., Nylon 11) placed in a 0.522 inch diameter die, and compacted using the same machine as used in Example 1. Compaction was completed in 4.31 seconds with about 320 psi compaction pressure having been applied to the disk. 1500 watt-seconds of power was applied having an amplitude of 0.001 inch and a frequency of 20 kilohertz. The density achieved was 4.73 grams per cubic centimeter, the energy product was 5.8 megagaussoersteds and $B_r$ was 4.8 kilogauss.

Example 3

The same alloy-nylon mix and equipment used in Example 2 was used with 320 psi of applied pressure and an ultrasonic power input of 1500 watt-seconds applied in waves having an amplitude of 0.001 inches and a frequency of 20 kilohertz. Compaction was completed in 4.08 seconds and yielded a magnetic disk having a density of 4.64 g/cc and exhibiting an energy product of 5.7 megagaussoersteds, and a $B_r$ value of 4.8 kilogauss.

While the invention has been described in conjunction with certain specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims The embodiments of the invention in which an exclusive property or privilege is claimed are defined as follows:

1. A method of substantially concurrently compacting and bonding a plurality of solid particles together into a unified mass having a desired shape and particle content greater than about 70% by volume and the balance substantially binder comprising the steps of:

placing a loose mixture of said particles and a thermobonding agent in a die having said desired shape, said thermobonding agent being selected from the group consisting of thermoplastic and thermosetting materials activateable by heat to bond said particles together;

positioning a punch in said die contiguous said mixture, said punch conforming substantially to said shape;

applying compaction pressure to said mixture with said punch to compact said mixture into said die; and applying sufficient ultrasonic energy to said mixture while applying said pressure to densify said particles, generate sufficient heat in said mixture to activate said thermobonding agent and effect said bonding.

2. The method according to claim 1 wherein said particles are metal.

3. The method according to claim 2 wherein said metal is selected from the group consisting of iron, steel and rare earth-ferromagnetic metal alloys.

4. The method according to claim 3 wherein said mass comprises at least about 85% by volume neodymium-iron-boron alloy.

5. The method according to claim 2 wherein said thermobonding agent is cured to a hardened state by said heat.

6. The method according to claim 2 wherein said thermobonding agent is melted by said heat and thereafter allowed to harden by cooling.

7. The method according to claim 2 wherein said thermobonding agent coats and encapsulates each of said particles in said mixtures.

8. The method according to claim 4 wherein said thermobonding agent comprises an epoxy resin and said mass has a density of at least about 6 g/cc.

9. The method according to claim 4 wherein said thermobonding agent comprises a polyamide and said mass has a density of at least about 4.7 g/cc.

* * * * *